United States Patent [19]

Cox

[11] Patent Number: 4,513,412
[45] Date of Patent: Apr. 23, 1985

[54] TIME DIVISION ADAPTIVE RETRANSMISSION TECHNIQUE FOR PORTABLE RADIO TELEPHONES

[75] Inventor: Donald C. Cox, Tinton Falls, N.J.

[73] Assignee: AT&T Bell Laboratories, Murray Hill, N.J.

[21] Appl. No.: 488,397

[22] Filed: Apr. 25, 1983

[51] Int. Cl.³ .............................................. H04B 7/02
[52] U.S. Cl. ...................................... 370/29; 455/33; 455/101; 455/134; 343/361
[58] Field of Search ................... 370/29; 455/101, 60, 455/52, 132, 133, 134, 272, 277; 343/361, 367, 370; 375/40, 100

[56] References Cited

U.S. PATENT DOCUMENTS

| | | | |
|---|---|---|---|
| 2,694,141 | 11/1954 | Mitchell | 455/33 |
| 3,631,494 | 12/1971 | Gans et al. | 343/100 |
| 3,693,088 | 9/1972 | Rustako, Jr. et al. | 325/56 |
| 3,696,421 | 10/1972 | Bitler | 343/100 |
| 4,041,397 | 8/1977 | Bauer et al. | 325/324 |
| 4,057,758 | 11/1977 | Hattori et al. | 325/304 |
| 4,083,009 | 4/1978 | Bickford et al. | 325/304 |
| 4,128,809 | 12/1978 | Kage | 375/100 |
| 4,317,218 | 2/1982 | Perry | 455/52 |
| 4,383,332 | 5/1983 | Glance et al. | 375/40 |

FOREIGN PATENT DOCUMENTS 54-121016  9/1979  Japan .................................... 455/52

OTHER PUBLICATIONS

Vigants, A. "The Number of Fades in Space–Diversity Reception", *BSTJ*, vol. 49, No. 7, Sep. 1970, pp. 1513–1530.
Yeh, Y. S., "An Analysis of Adaptive Retransmission Arrays in a Fading Environment", *BSTJ*, vol. 49, No. 8, pp. 1811–1825, Oct. 1970.
Lee, Y., "Polarization Diversity System for Mobile Radio", *IEEE Trans. on Communications*, vol. COM-21, No. 6, pp. 912–923, Oct. 1972.
Bitler, J. S. et al., "A Mobile Radio Single–Frequency 'Two–Way' Diversity System Using Adaptive Retransmission from the Base", Nov. 1973.
W. C. Jakes, Jr., "Microwave Mobile Communications", John Wiley & Sons, pp. 311, 399–401, 1974.
Henry, P. S. et al., "A New Approach to High-–Capacity Digital Mobile Radio", *BSTJ*, vol. 60, No. 8, pp. 1891–1904, Oct. 1981.

*Primary Examiner*—Robert L. Griffin
*Assistant Examiner*—Timothy K. Greer
*Attorney, Agent, or Firm*—Erwin W. Pfeifle

[57] ABSTRACT

The present invention relates to a portable transceiver and a remote terminal station each using at least two antennas with different polarization transmission capabilities for an adaptive retransmission technique. In the present adaptive retransmission technique, the terminal station transmits the same preamble signal in at least two time slots of a frame period of a time division sequence using the antenna receiving the strongest signal from the transceiver in the immediately prior frame period followed by a binary message signal using the same antenna. The transceiver receives each of the preamble transmissions from the terminal station via a separate one of differently oriented antennas and determines which antenna received the strongest signal. The message signal from the terminal station is then received via the antenna of the transceiver having received the strongest signal and also sends its response message signal on that antenna during a separate time slot of a frame period.

17 Claims, 11 Drawing Figures

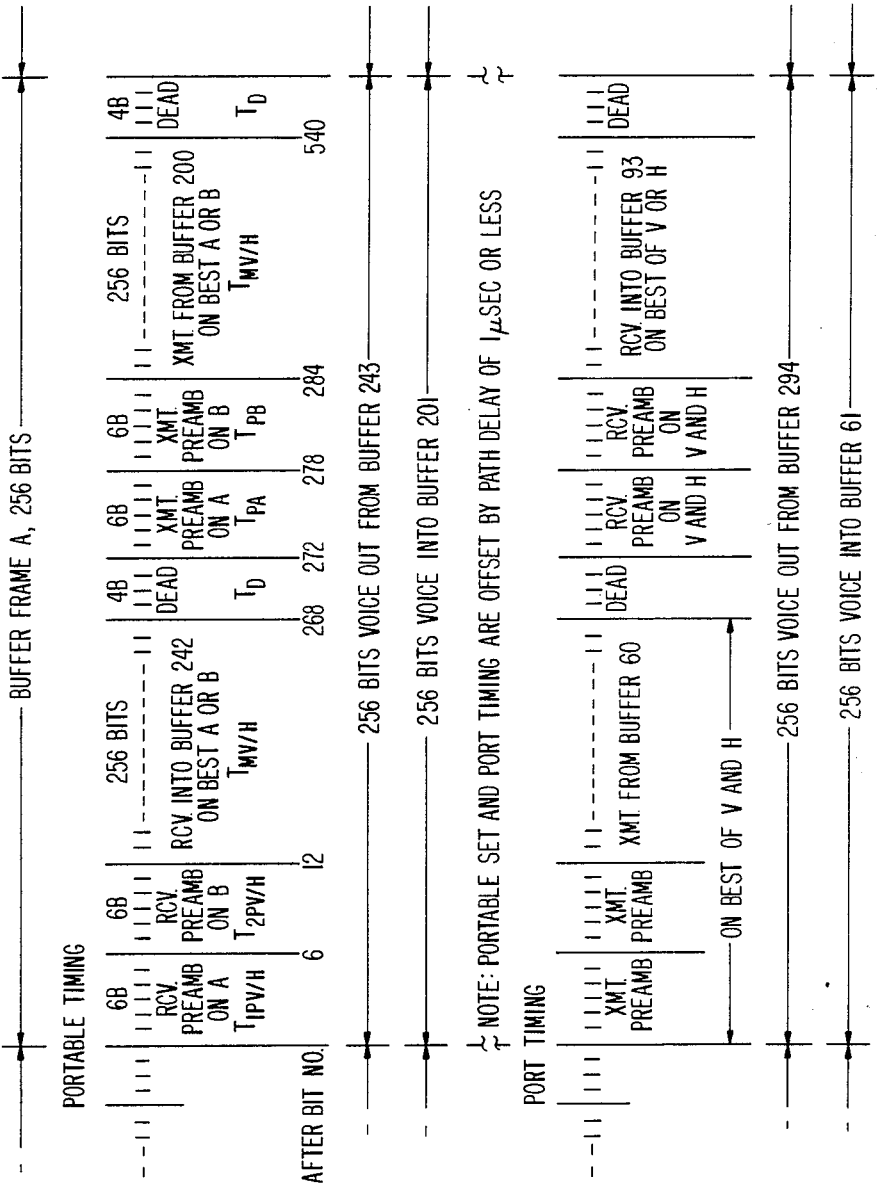

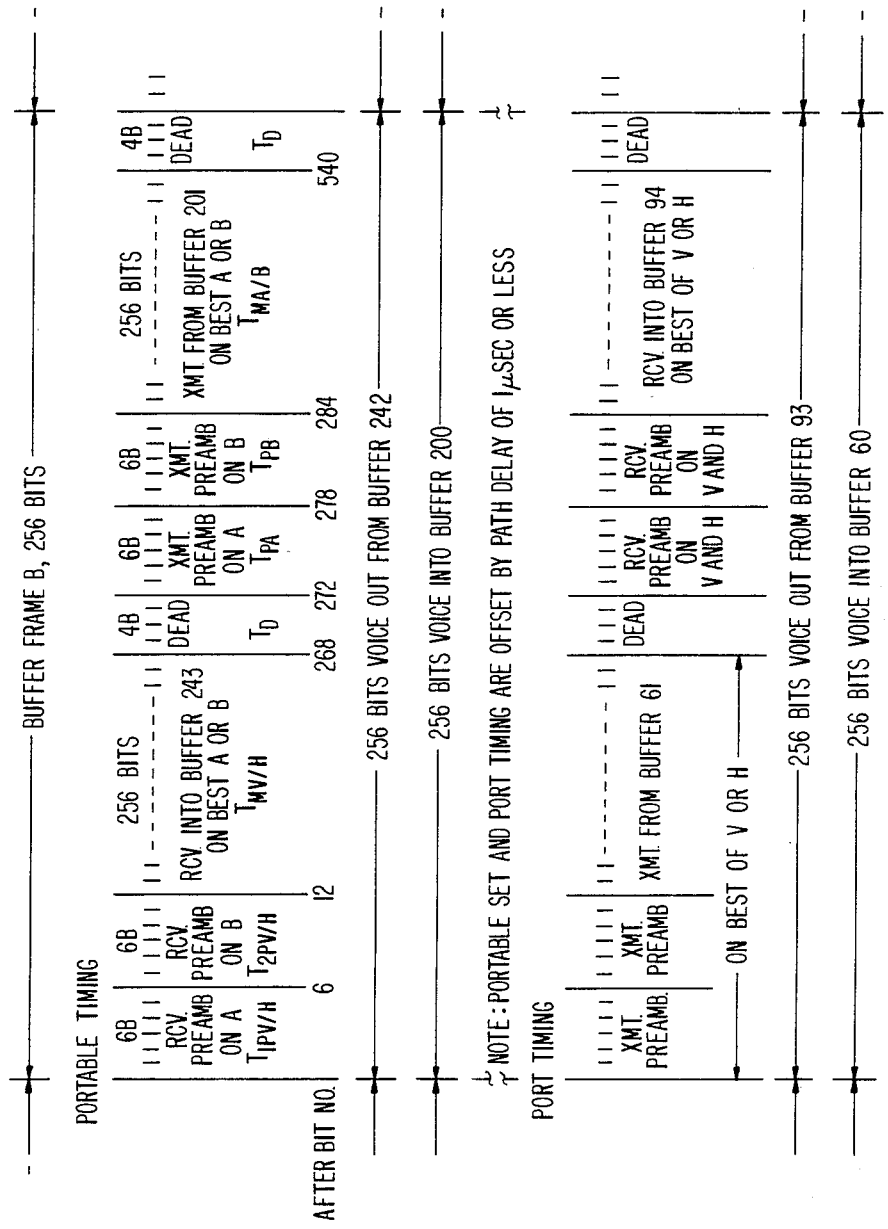

TIME DIVISION ADAPTIVE RETRANSMISSION TECHNIQUE FOR PORTABLE RADIO TELEPHONES

BACKGROUND OF THE INVENTION

1. Field of the Invention

The present invention relates to a time division adaptive retransmission technique for portable radiotelephones and, more particularly, to a radiotelephone system arrangement where the terminal and portable station each include at least two antennas capable of transmitting and receiving orthogonally polarized signals, and the technique used alternately transmits a preamble on each antenna at the beginning of each time division frame from the portable station to permit optimum antenna selection at both stations using a single receiver and transmitter in the portable station.

2. Description of the Prior Art

The reduction of fluctuations of portable radiotelephone signals caused by random orientation and multipath propagation has been of interest in recent years. A typical technique for overcoming fades has been to provide space diversity using two or more antennas and then selecting the antenna which provides the best signal to the base or portable station receivers at any instant of time, or only when the currently selected antenna signal indicates a fade below a predetermined threshold. In this regard see, for example, U.S. Pat. Nos. 3,693,088 issued to A. J. Rustako, Jr. et al on Sept. 19, 1972; 4,041,397 issued to P. W. Bauer et al on Aug. 9, 1977; and 4,317,218 issued to F. G. Perry on Feb. 23, 1982.

Another technique is the use of N-branch phase conjugate adaptive retransmission where each branch determines the phase of the received signal and uses that phase to retransmit its signal back to the remote location. In this regard see, for example, U.S. Pat. Nos. 3,631,494 issued to M. J. Gans et al on Dec. 28, 1971 and 3,696,421 issued to J. S. Bitler on Oct. 3, 1972, and the article "A Mobile Radio Single-Frequency 'Two-Way' Diversity System Using Adaptive Retransmission from the Base" by J. S. Bilter et al in IEEE Transactions On Communications, Vol. COM-21, No. 11, November 1973 at pages 1241-1247.

Digital time-division adaptive retransmission in the mobile radio environment was also analyzed more recently in the article "A New Approach to High-Capacity Digital Mobile Radio" by P. S. Henry et al in BSTJ, Vol. 60, No. 8, October 1981 at pages 1891-1904.

The problem remaining in the prior art is to provide a technique using only one transmitter and receiver at the portable station which will substantially mitigate the effects of random orientation and multipath propagation for portable radiotelephones while selecting a best antenna of two or more antennas for transmission and reception.

SUMMARY OF THE INVENTION

The foregoing problem in the prior art has been solved in accordance with the present invention which relates to a time division adaptive retransmission technique for portable radiotelephones and, more particularly, to a radiotelephone system arrangement where the terminal and portable station each include at least two antennas capable of transmitting and receiving orthogonally polarized signals. The technique used sequentially transmits a preamble signal from the two portable set antennas followed by a message signal from the portable set antenna found to have received the stronger preamble signal in the prior time division sequence. The terminal receives each of the preamble signals on a separate one of its antennas and determines which antenna received the stronger signal. The terminal then receives the message signal from the portable set on the antenna found to have received the stronger signal in the prior time division sequence. The terminal then sends at least two sequential preamble signals back to the portable set on the antenna just found to receive the stronger signal in this time division sequence, followed by a message signal on the same antenna. The portable set receives the at least two sequential preamble signals on separate ones of its at least two antennas and determines which antenna received the stronger signal and uses that antenna to receive the message signal.

It is an aspect of the present invention to provide a technique which will provide optimum antenna selection at a portable set and an associated remote terminal station where the portable set includes a single receiver and transmitter and each portable set and terminal includes at least two antennas.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIGS. 9 and 10 are timing diagrams of the interaction between the PORT and Portable Set for two sequential frame periods A and B, respectively, in accordance with the present invention; and FIG. 11 is a diagram of the positioning of FIGS. 9 and 10.

DETAILED DESCRIPTION

Figure 1:
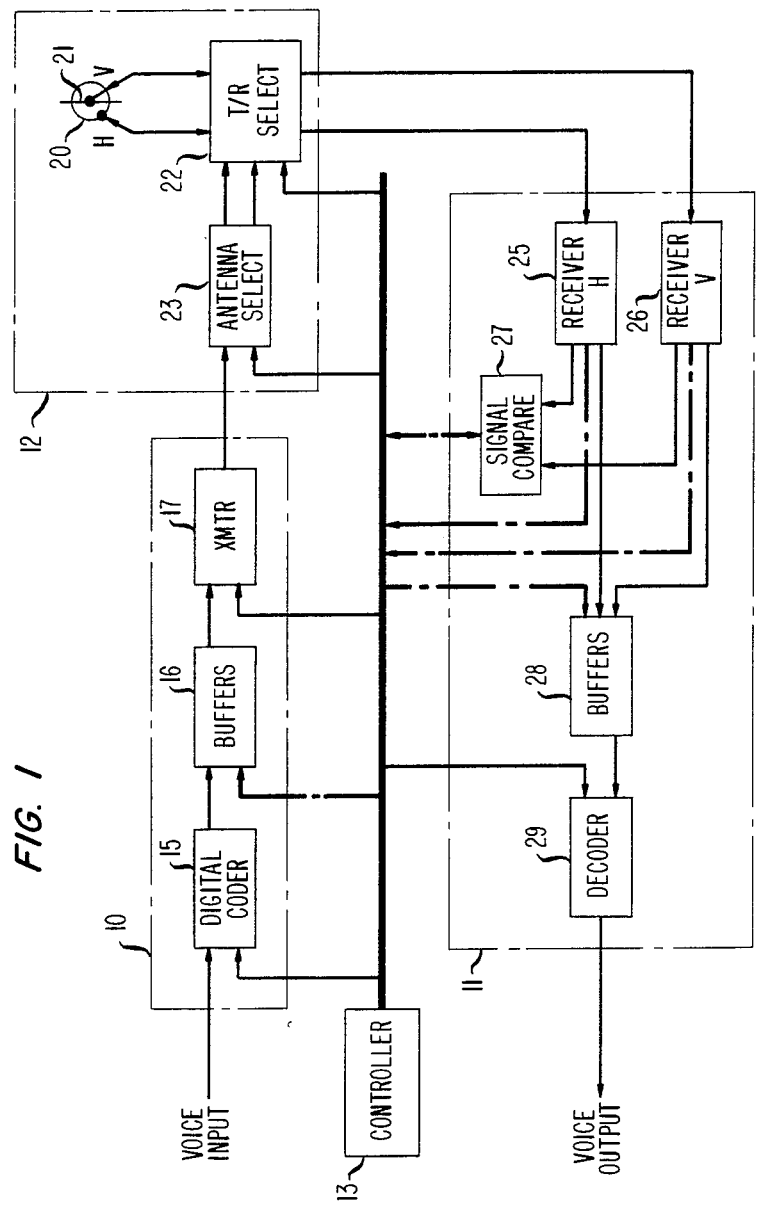
FIG. 1 is a block diagram of a Portable Radio-telephone Terminal (PORT) in accordance with the present invention.

FIG. 1 is a block diagram of an exemplary arrangement of a Portable Radio-telephone Terminal (PORT). The PORT is a fixed radio terminal that provides voice and/or data communication paths with portable sets associated therewith. The PORT comprises a transmitter section 10, a receiver section 11, an antenna section 12 and a controller 13. The transmitter section includes a digital coder 15, Buffers 16 and a transmitter 17 which are under the control of controller 13. The coder 15 encodes an input voice or data signal into an appropriately encoded output signal which is temporarily stored in Buffers 16 as directed by controller 13. The transmitter 17 receives the signals stored in Buffers 16 during predetermined time slots of a time division sequence as determined by controller 13, and appropriately upconverts, if necessary, and amplifies these signals for delivery to antenna section 12.

Antenna section 12, as shown in FIG. 1, comprises a horizontally polarized antenna 20, a vertically polarized antenna 21, a transmit/receive selection switch 22, which is under the control of controller 13 as will be explained in greater detail hereinafter, and an antenna selection switch 23 which is also under the control of controller 13. It is to be understood that the use of horizontally and vertically polarized signals is for exemplary purposes only and not for purposes of limitation since other types of orthogonally polarized signals could be used instead. Additionally, more than two antennas can be used. More particularly, the controller 13 selects, via T/R switch 22, whether the transmitter section 10 or the receiver section 11 is connected through antenna section 12 and, via antenna switch 23, whether the through-connected section is transmitting or receiving on the vertically polarized antenna 21 or the horizontally polarized antenna 20.

The receiving section 11 comprises a first and a second receiver 25 and 26 for receiving horizontally and vertically polarized signal, respectively, from antenna section 12. Receivers 25 and 26 each are capable of providing bit and frame synchronization information which is transmitted to controller 13 and for detecting the amplitude of the input signal from the associated antenna for transmission to a signal comparison arrangement 27. The signal comparison arrangement 27 determines which receiver 25 or 26 received the stronger signal and transmits such information to controller 13 for appropriate antenna selection thereafter. The encoded voice or data signal received from the remote portable set is transmitted to Buffers 28 where such signal is temporarily stored under direction of controller 13. At the appropriate time, controller 13 transmits the stored signal in Buffers 28 to decoder 29 where the signal is decoded for transmission to the intended user.

Figure 2:
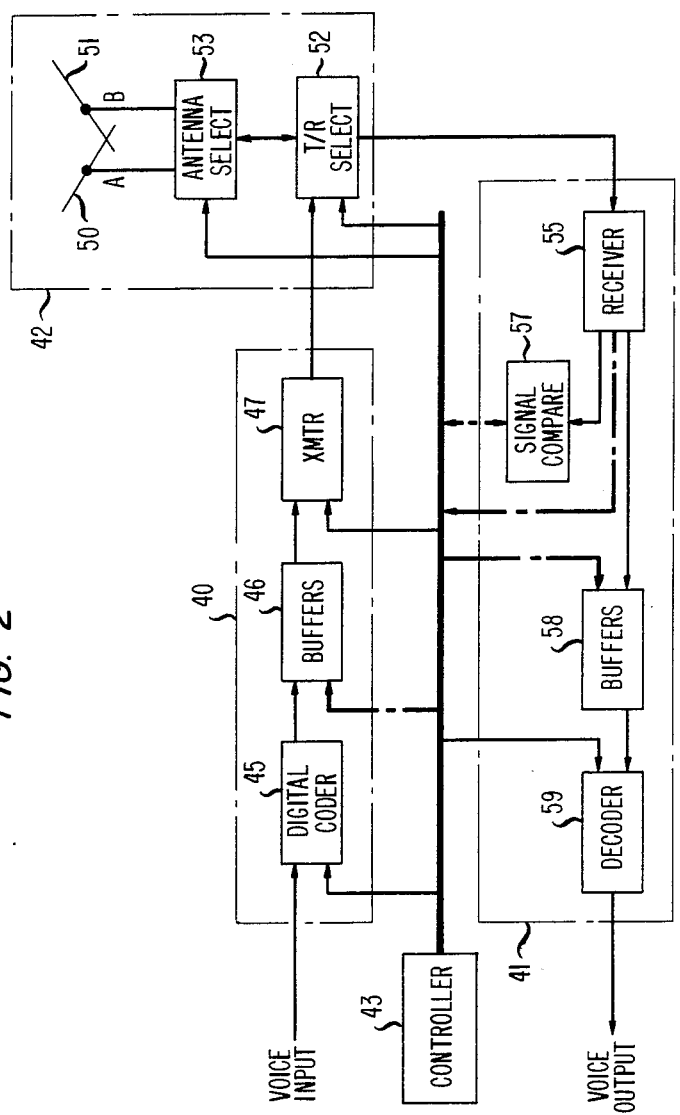
FIG. 2 is a block diagram of a Portable Set in accordance with the present invention.

FIG. 2 is a block diagram of a Portable Set which, like the PORT shown in FIG. 1, comprises a transmitting section 40, a receiving section 41, an antenna section 42 and a controller 43. Transmitting section 40 comprises a digital coder 45, Buffers 46 and a transmitter 47 which function as described for coder 15, Buffers 16 and transmitter 17, respectively, of PORT transmitting section 10. Antenna section 42 comprises a first antenna 50 and a second antenna 51 which are separated to produce uncorrelated fading of the received signal and are oriented at different angles to provide different angular responses to the signal received from the PORT. It is to be understood that the Portable Set antenna section 42 can comprise more than two antennas, but for purposes of simplicity only two antennas will be included in the discussion hereinafter. A Transmit/Receive (T/R) selection switch 52 selects whether the transmitting section 40 or receiving section 41 is connected through antenna section 42 in response to control signals from controller 43. An antenna select switch 53 is responsive to control signals from controller 43 to connect the transmitting section 40 or the receiving section 41 to antenna 50 or antenna 51.

The receiving section 41 comprises a single receiver 55, a signal comparison arrangement 57, Buffers 58 and a decoder 59 which function as described for receiver 25, signal comparison arrangement 27, Buffers 28 and decoder 29, respectively, of the PORT receiving section 11 of FIG. 1. In accordance with the present invention, as will be described hereinafter, synchronism and transmission on a time division basis of special digital sequences between a Portable Set of FIG. 2 and a PORT of FIG. 1 make it possible for the Portable Set to determine which of its antennas 50 or 51 provides the best radio circuit for digitized voice or data transmission and reception. The synchronized sequence transmission make this determination possible with only one receiver in the Portable Set. Thus, the performance of selection diversity and selection retransmission are achieved with a simpler Portable Set than is required for conventional multiple-receiver selection-diversity techniques.

Typical timing sequences for a particular timing example in accordance with the present invention, are illustrated in the timing diagram of FIGS. 9 and 10. These diagrams are based on buffer frame lengths of 256 bits, preamble lengths of 6 bits and a guard or dead space between receive and transmit sequences of 4 bits. The digital coders 15 and 45 and decoders 29 and 59 in the example run at a rate of 32,000 bits/second. It is to be understood that these timing values and bit lengths are chosen to illustrate the present technique and that other timing combinations and bit lengths will provide satisfactory performance.

In FIGS. 9 and 10, the timing sequence for both the PORT and Portable Set are illustrated on separate lines for a Frame A and a next sequential Frame B, respectively. Each frame, in accordance with the example above, transmits an exemplary 256 bits of voice or data from the PORT and an exemplary 256 bits of voice or data from the Portable Set in the "RUN" mode when the system is in stable operation after a "STARTUP" mode. In accordance with the present technique, as shown in FIGS. 9 and 10, in Frame A the PORT transmits the exemplary 6 preamble bits on the antenna 20 or 21 which was determined to receive the best signal from the Portable Set in the previous frame. It is to be understood that if the Portable Set were to include more than two antennas, that the 6-bit preamble would have to be transmitted separately to each of the Portable Set antennas in separate time slots of a frame period. Immediately thereafter, the PORT transmits the same exemplary 6 preamble bits over this same antenna 20 or 21 followed by the 256 bits of encoded voice or data.

Concurrent with the PORT transmissions, the Portable Set receives the first 6-bit preamble transmission on, for example, antenna 50 and the second 6-bit preamble transmission on antenna 51 and determines which antenna received the stronger signal. This antenna is then used to receive the 256-bit encoded voice or data signal from the PORT. After a 4-bit dead space, the Portable Set transmits a 6-bit preamble first via antenna 50 and then via antenna 51 followed by 256 bits of encoded voice or data on the antenna just previously found to receive the stronger signal. Concurrent therewith, the PORT receives the first and the second 6-bit preamble transmission via antenna 20 and 21, respectively, and determines which antenna combination 50 to 20, 50 to 21, 51 to 20 or 51 to 21 received the stronger signal. The antenna 20 or 21 receiving the stronger signal is then used to transmit the 2 exemplary 6-bit preamble signals and the exemplary 256-bit encoded voice or data signal to the Portable Set in the next frame. The 256-bit encoded voice or data signal from the Portable Set is then received, following reception of the preamble transmission from the Portable Set, via the antenna 20 or 21 having received the strongest preamble signal in the previous frame. The above-described sequence is then repeated.

Figure 3:
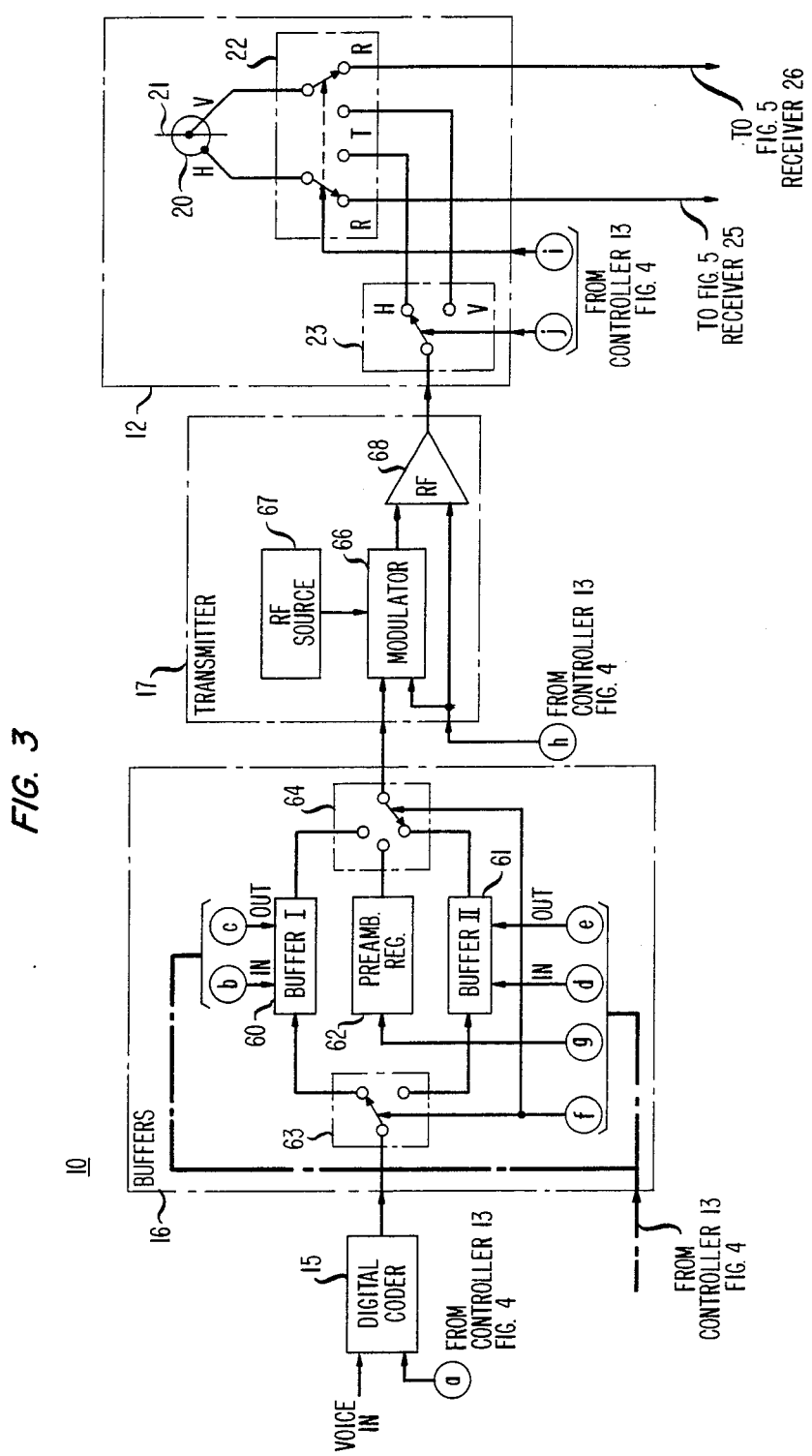
FIG. 3 is an expanded block diagram of the PORT transmitter and antennas shown in FIG. 1 including various control lines to and from the PORT controller of FIG. 4 and antenna transmission lines to the PORT receivers of FIG. 5 in accordance with the present invention.

FIGS. 3–5 and 6–8 are expanded block diagrams of the PORT and Portable Set arrangements, respectively, of FIGS. 1 and 2 to provide a clearer understanding of the operation of the present system which will be described hereinafter. In FIG. 3, Buffers 16 of PORT transmitter 16 is shown as comprising a first buffer 60 and a second buffer 61 each capable of storing 256 bits of encoded voice or data information. The inputs to buffers 60 and 61 are connected to separate output terminals of a SPDT switching means 63 while the outputs of buffers 60 and 61 are connected to separate input terminals of a Single-Pole, Triple-Throw (SPTT) switching means 64. A 6-bit preamble register 62 stores a 6-bit preamble and is connected at its output to a third input terminal of switching means 64. The reading of the preamble from preamble register 62 is timed by a bit clock pulse sequence on line "q" from controller 13 shown in FIG. 4. Buffers 60 and 61 are selectively inputted at a predetermined clock rate from controller 13 via control signals on lines "b" and "d", respectively, while buffers 60 and 61 are outputted at a predetermined clock rate from controller 13 via control lines "c" and "e", respectively. The selection of the buffer 60 or 61 to receive the output signal from coder 15 via switching means 63, and the selection of either one of buffers 60–62 to be connected to transmitter 17 at any instant of time is determined by controller 13 via a control signal on line "f".

Transmitter 17, of the PORT, is shown as including a modulator 66 which modulates the output signal from Buffers 16 with a radio-frequency (RF) signal from RF source generator 67. The signal from modulator 66 is amplified in RF amplifier 68 and the amplified signal is transmitted to antenna section 12. The modulator 66 and RF amplifier 68 are turned on or off under the control of controller 13 via a control signal on line "h".

Antenna section 12, of the PORT, shows an enhanced view of each of the selective switches 22 and 23. More particularly, antenna selection switch 23 is shown as a SPDT switch which, under the control of controller 13 via a control signal on line "j", connects the output of transmitter 17 to a first or a second input to T/R selection switch 22 associated with antenna 20 or 21, respectively. T/R selection switch 22 is shown as a pair of SPDT switches, each associated with a separate one of antennas 20 and 21. Each switch selectively connects the associated antenna to either one of transmitter 17 or a separate one of PORT receivers 25 and 26, shown in expanded view in FIG. 5, in response to a control signal on line "i" from controller 13.

Figure 5:
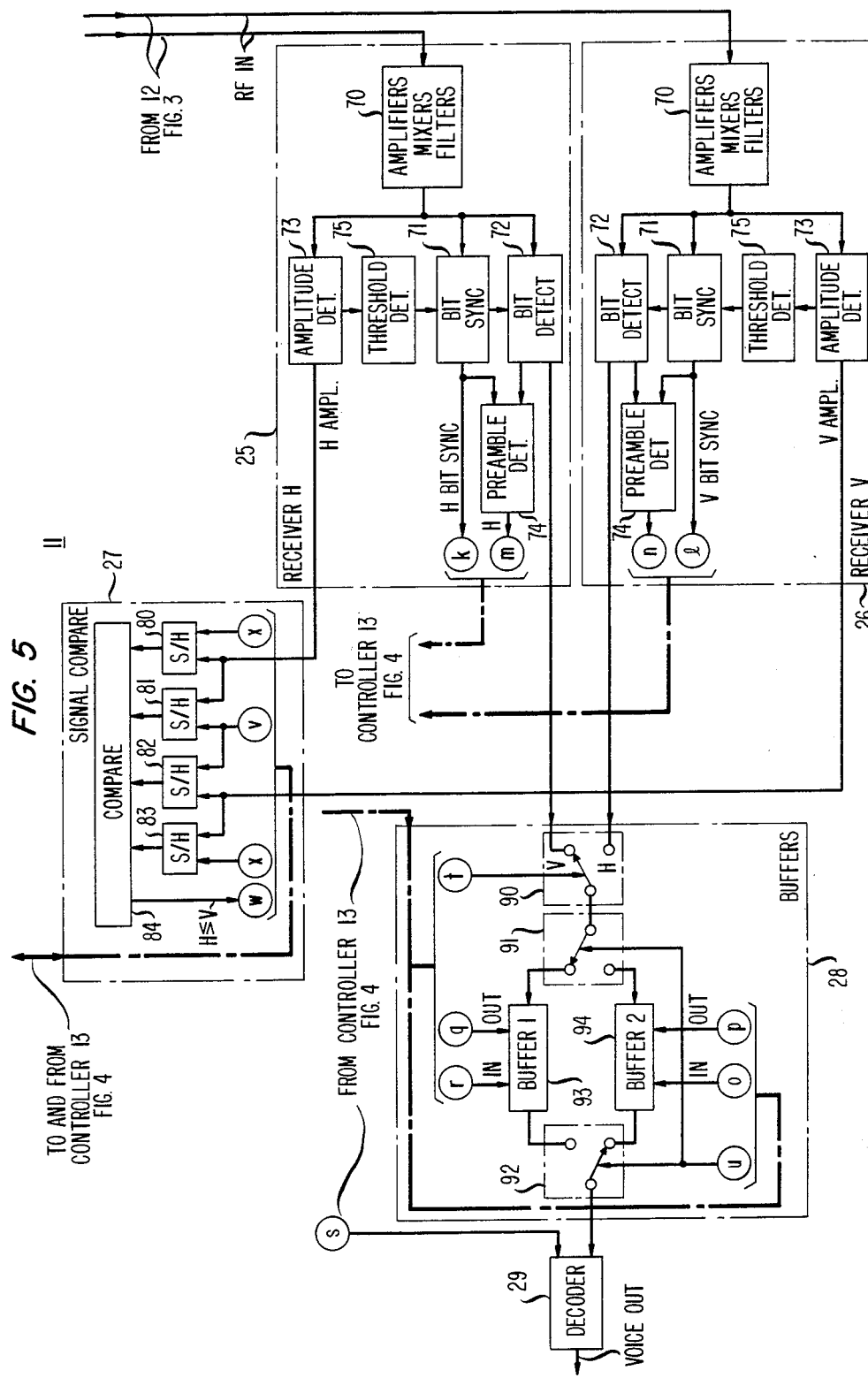
FIG. 5 is an expanded block diagram of the PORT receivers of FIG. 1 including various control lines to and from the PORT controller of FIG. 4.

In FIG. 5, each of receivers 25 and 26 have corresponding arrangements and only receiver 26 will be described in detail and it is understood that a similar description applies to receiver 25. The input to receiver 26 is obtained from the associated antenna 21 via selection switch 22 of FIG. 3 during the appropriate portion of the frame sequence shown in FIGS. 9 and 10. The RF input signal is received in an Amplifier-Mixing-Filtering device 70 which amplifies the received signal, downconverts it if necessary to, for example, IF frequencies and filters the signal to only pass the desired signal as is well-known in the art. The output signal from device 70 is concurrently transmitted to a Bit Synchronization device 71, a Bit Detector 72 and an Amplitude Detector 73.

Bit Synchronization Device 71 uses the input signal from device 70 to provide bit synchronization pulses to Bit Detector 72 to Controller 13 via control line "l", and to a Preamble Detector 74. Bit Detector 72 functions to detect the received preamble and encoded voice or data signals, and Amplitude Detector 73 functions to detect the amplitude of the received signal. The output of Bit Detector 72 is transmitted to both the Preamble Detector 74 and Buffers 28 for temporary storage while the output of Amplitude Detector 73 is compared to a predetermined amplitude threshold in a Threshold Detector 75 and an indication of the strength of the received signal is transmitted to Signal Comparison arrangement 27. The output of Preamble Detector 74 is a pulse indicating the reception of a 6-bit preamble signal, which pulse is transmitted to Controller 13 via a control signal on line "n".

As stated hereinbefore, receiver 25 comprises corresponding circuitry 70–75, with Preamble Detector 74 of receiver 25 providing an output control signal on line "m" to Controller 13 and an indication of the strength of the received signal on antenna 20 is sent to Signal Comparison arrangement 27. Bit Synchronization device 71 also provides bit synchronization pulses on line "k" to Controller 13.

Signal Comparison arrangement 27 is shown as comprising 4 Sample and Hold (S/H) devices 80–83 with S/H devices 80 and 81 accepting the output from Amplitude Detector 73 of receiver 25 in response to control signals on lines "x" and "v", respectively, from Controller 13 and S/H devices 82 and 83 accepting the output from Amplitude Detector 73 of receiver 26 in response to control signals on lines "v" and "x", respectively, from Controller 13. The outputs from S/H devices 80–83 are transmitted to a comparison circuit 84 where the levels of S/H devices 80 to 83 are compared to determine which of the four received signals is the strongest. An indication of which is the strongest is transmitted to Controller 13 via a control signal on line "w".

Buffers 28 is shown in FIG. 5 as comprising a SPDT Receiver Selection switch 90, a pair of SPDT Buffer selection switches 91 and 92 and a first buffer 93 and a second buffer 94, each capable of storing 256 bits of encoded voice or data. More particularly, the two fixed terminals of switch 90 are connected to the outputs of separate ones of the Bit Detectors 72 of receivers 25 and 26. The movable arms of switches 90 and 91 are interconnected and buffers 93 and 94 are connected between separate ones of the fixed terminals of switches 91 and 92. The movable arm of switch 92 provides the output from Buffers 28 and is connected to the input of decoder 29. The action of switch 90 is controlled by Controller 13 via a control signal on line "t" and the action of switches 91 and 92 is controlled from Controller 13 via a control signal on line "u". Buffers 93 and 94 are selectively inputted at a predetermined clock rate from Controller 13 via control signals on lines "r" and "o", respectively, and are selectively outputted at a predetermined clock rate from Controller 13 via respective control signals on lines "q" and "p". The decoder 29 is timed via decoder clock signals on line "s" from Controller 13, and the output from decoder 29 is transmitted to the intended end user.

Figure 4:
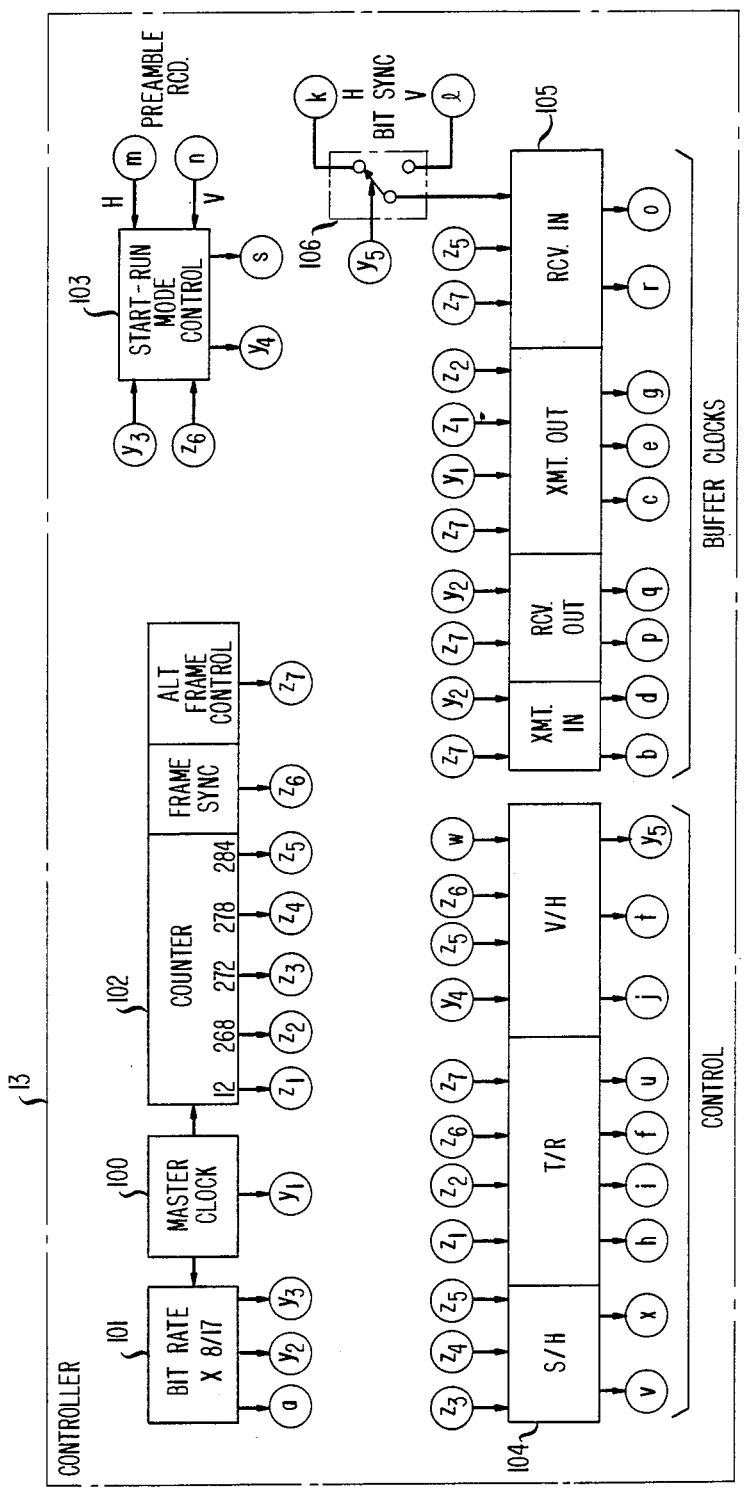
FIG. 4 is an expanded block diagram of the PORT controller including designated control lines between the controller and the PORT transmitter, receivers and antenna switches of FIGS. 3 and 5.

Controller 13 is shown in FIG. 4 as comprising a master clock 100, a bit rate converter 101 including, for example, a frequency multiplier and divider of X8/17 for providing the basic clock rates of the system, a counter and digital logic count down 102 for providing various timed control pulses during a frame, a start-run mode control section 103 responsive to control signals from Preamble Detectors 74 of receivers 25 and 26 and timing signals from converter 101 and counter 102 for providing status control, a control section 104 responsive to timing pulses from counter 102, start-run mode control section 103 and Signal Comparison arrangement 27 to provide various control signals to the PORT, and a buffer clock section 105 responsive to control signals from counter 102 and bit synchronization switch 106 for providing the necessary control and timing signals to Buffers 16 and 28 to properly implement the timing diagram of FIG. 5.

Figure 6:
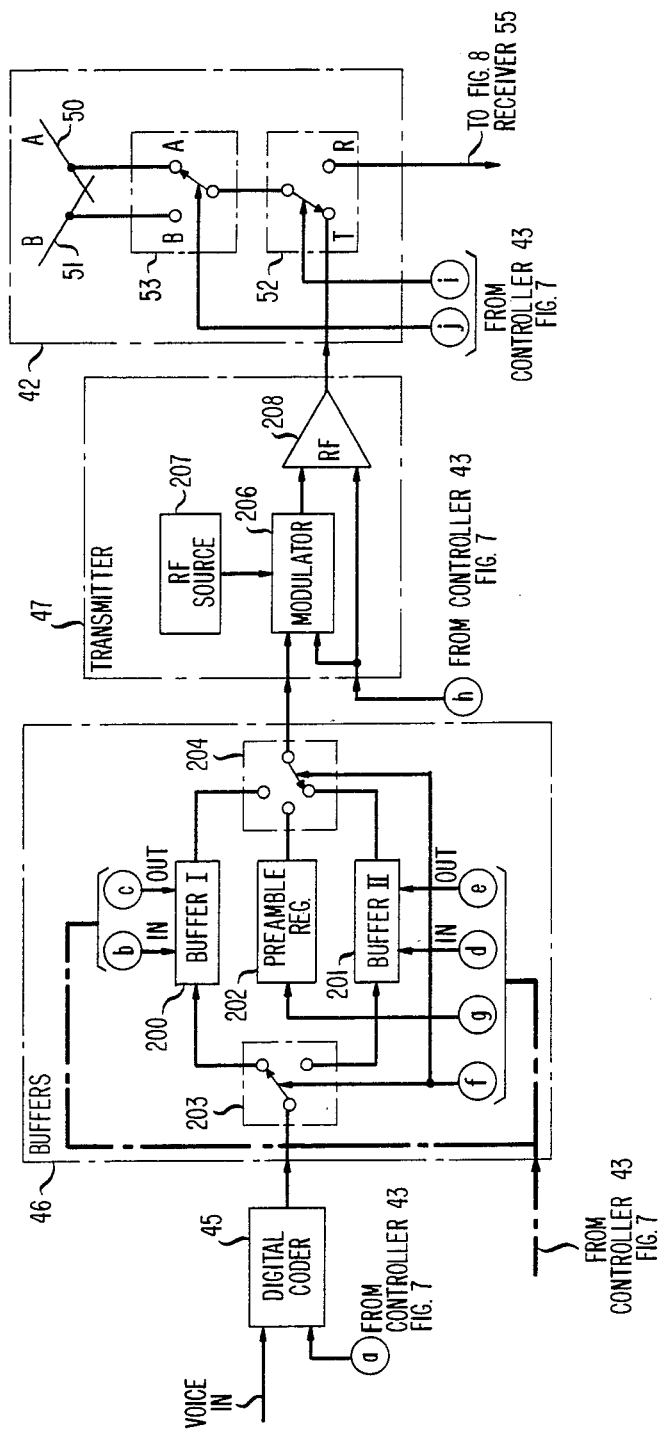
FIG. 6 is an expanded block diagram of the Portable Set transmitter and antennas shown in FIG. 2 including the various control lines to and from the Portable Set controller of FIG. 7 and transmission lines to the Portable Set receiver of FIG. 8 in accordance with the present invention.
Figure 7:
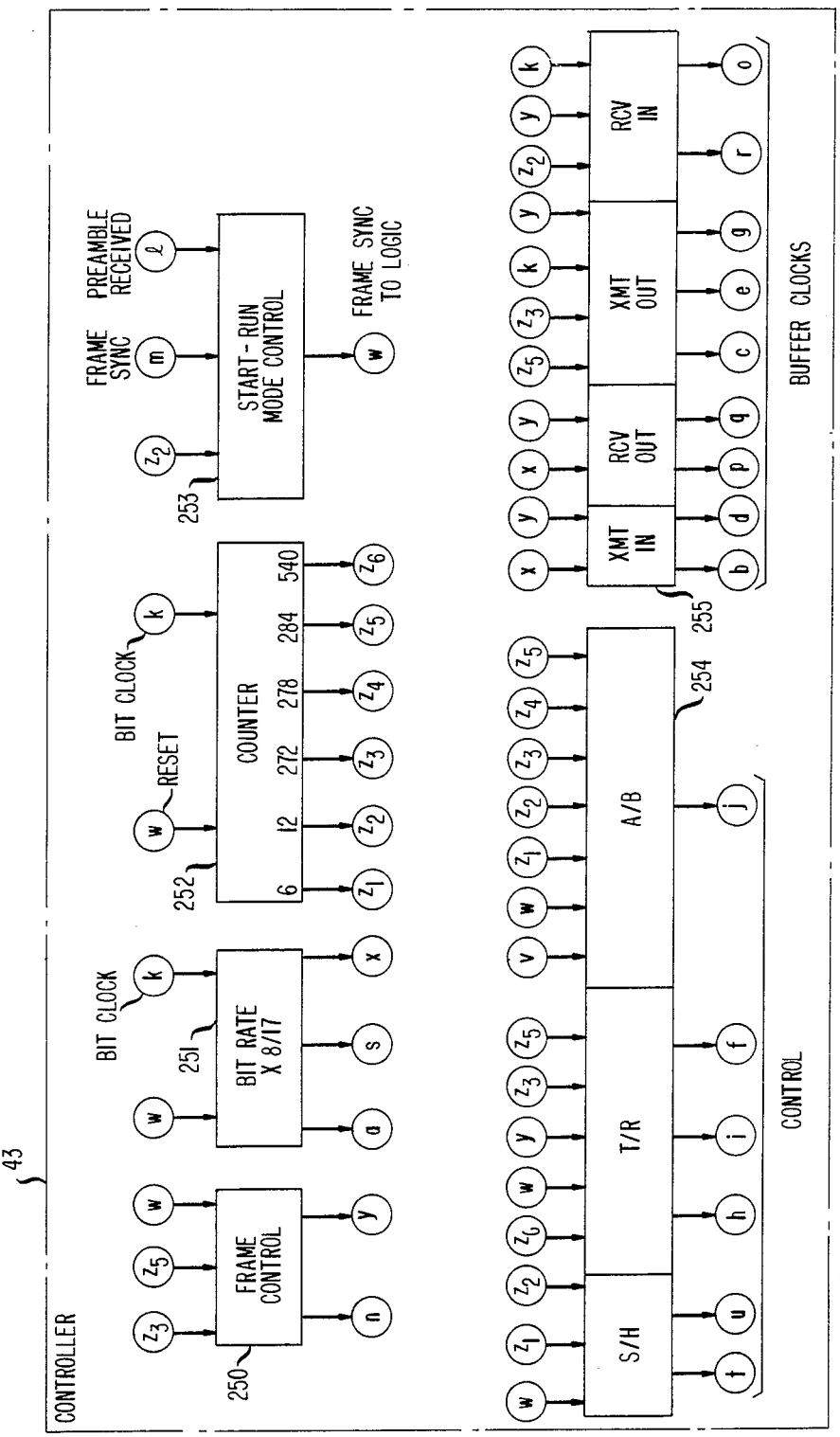
FIG. 7 is an expanded block diagram of the Portable Set controller shown in FIG. 2 including designated control lines between the controller and the Portable Set transmitter, receiver and antenna switches.
Figure 8:
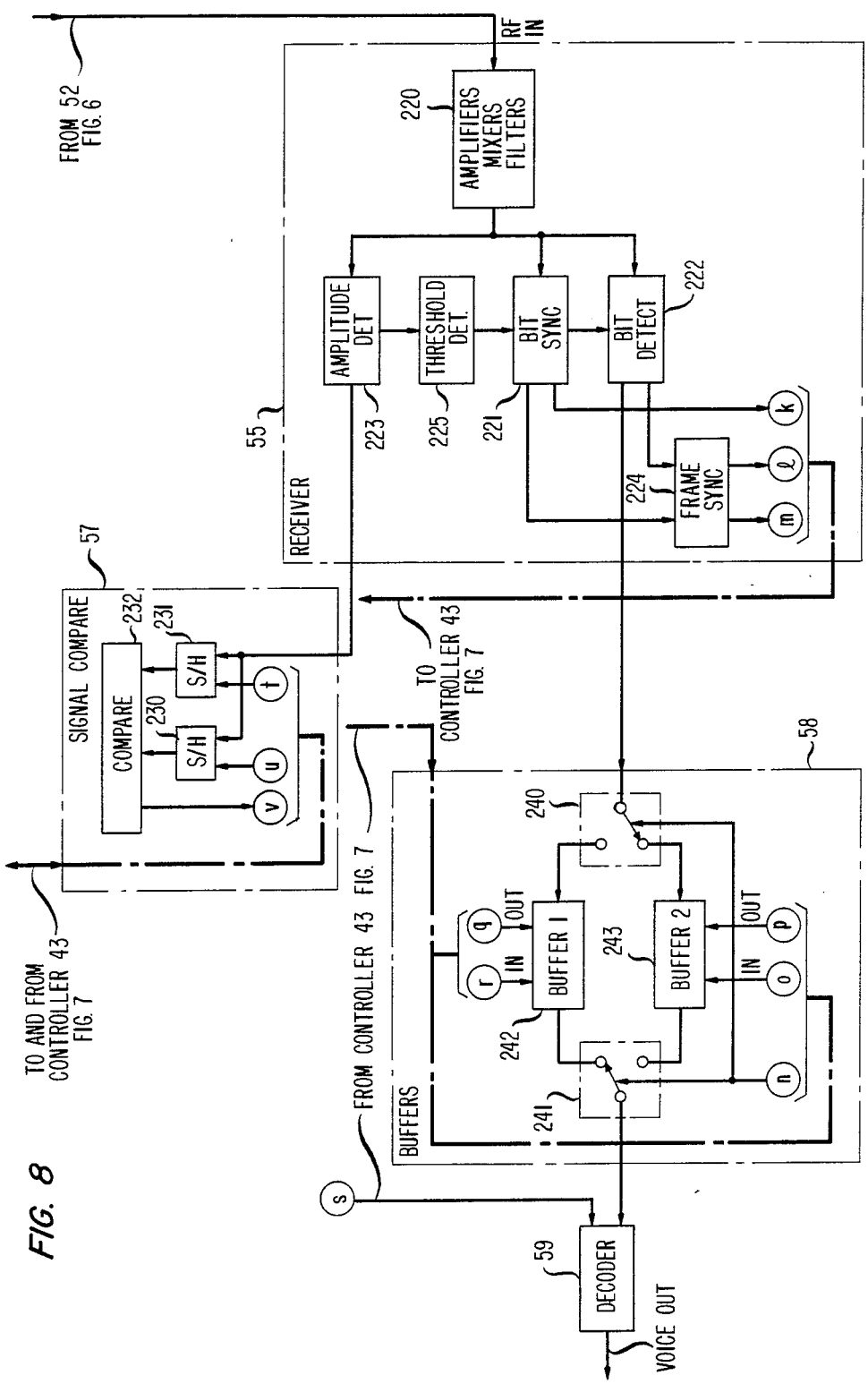
FIG. 8 is an expanded block diagram of the Portable Set receiver shown in FIG. 2 including control lines to and from the Portable Set controller of FIG. 7.

FIGS. 6-8 are enhanced block diagrams of the Portable Set of FIG. 2. In FIG. 6, Buffers 46 of the Portable Set is shown as comprising a first and a second 256-bit buffer 200 and 201, a 6-bit preamble register 202, a SPDT switching means 203 and a SPTT switching means 204. Each of these elements 200-204 are connected and function as described for the corresponding elements 60-64 in PORT buffers 16 of FIG. 3.

Transmitter 47 is shown in FIG. 6 as comprising a modulator 206, an RF Source 207 and an RF amplifier 208 which are connected and function as described for corresponding elements 66-68 in PORT transmitter 17 of FIG. 3. The T/R selection switch 52 is shown as a SPDT switch with the output of transmitter 47 and the input to receiver 55 being connected to separate ones of the fixed terminals of switch 52. Antenna selection switch 53 is shown as a SPDT switch with the fixed terminals thereof being connected to separate ones of the antennas 50 and 51 and the movable arms of switches 52 and 53 being interconnected.

As shown in FIG. 8, receiver 55 is very similar to either one of receivers 25 or 26 of the PORT, shown in FIG. 5, in that receiver 55 comprises an Amplifier-Mixer-Filter arrangement 220, a Bit Synchronization device 221, a Bit Detector 22, an Amplitude Detector 223 and a Threshold Detector 225 which are interconnected and function as described for corresponding elements 70-73 and 75 of receiver 26 in FIG. 5. A Frame Synchronization device 224, however, replaces the Preamble Detector 74 of the PORT receiver, and functions to detect a received preamble and to generate a preamble received control signal on line "l" and a frame synchronization control signal on line "m" which is verified by a preamble detection section having received a valid preamble in the 6 bits after the frame synchronization control signal.

The Signal Comparison arrangement 57 is shown in FIG. 8 as comprising a first and a second Sample and Hold (S/H) device 230 and 231, and a comparison means 232. The inputs to the S/H devices 230 and 231 are from Amplitude Detector 223 in receiver 55 and the outputs therefrom are to comparison means 232. The inputting and outputting of information to and from S/H devices 230 and 231 is under the control of Controller 43, shown in FIG. 7, via control signals on lines "u" and "t", respectively. The output from Comparison means 232 is a signal on line "v" to Controller 43 indicating which of devices 230 or 231 had the stronger signal for antenna selection for the reception of the 256-bit encoded voice or data signal from the PORT.

Buffers 58 is shown in FIG. 8 as including an input and an output buffer selection switch 240 and 241, respectively, and a first and a second buffer 242 and 243. Elements 240-243 are interconnected and function as described for the corresponding elements 91-94 of Buffers 28 in FIG. 3.

Controller 43 is shown in FIG. 7 as comprising a Frame control section 250 for providing predetermined control signals for frame A and B, shown in FIGS. 9 and 10, at the start of each frame period, a bit rate converter 251, a counter and digital logic countdown section 252, a start-run mode control section 253, a control section 254 and a buffer clock section 255. Elements 251-255 function in the manner of corresponding elements 101-105 in Controller 13 in FIG. 4.

The operation of the present system will now be described assuming that the system is in stable operation in the RUN mode. The STARTUP mode operation will be described thereafter. The sequence description starts after the PORT synchronization pulse at the beginning of buffer frame A in FIG. 9.

In the PORT at the start of frame A in FIG. 9, frame sequencing pulses on control line $Z_7$ from PORT Controller Counter 102 cause switching of the transmit and receive Buffers 16 and 28. The digital coder 15 output is switches via switching means 63 into transmit Buffer 61 by the T/R controller portion of Control Section 104 in Controller 13 via line "f". The output of receiver Buffer 94 is switched via switch 92 to the decoder 29 input by the T/R controller portion of Control Section 104 via line "u". The buffer clocks from Buffer Clock section 105 of Controller 13 are also connected by internal logic to clock the transmit buffer 61 and the receive buffer 94 at the coder/decoder rate, $R_c$, via lines "d" and "p" respectively. In the run mode, both the coder 15 and the decoder 29 are continuously clocked at rate $R_c$ via lines "a" and "s".

The transmit/receive, T/R, controller in Control Section 104 of Controller 13 connects the preamble register 62 to the modulator 66 via switching means 64 and a signal on line f, turns on the transmitter modulator 66 via line "h" and connects the antenna T/R switch 22 for transmit via line "i". The transmit antenna selection switch 23 is set via line "j" to either the vertically, V, or horizontally, H, polarized antenna 21 and 20 by the V/H controller logic of Control section 104. The selection of V or H is determined by which antenna 20 or 21 provided the best reception during the portable preamble-sequence transmission in the previous frame. The corresponding V/H selection sequence will be described for this frame later. The setting of the V/H antenna switch 23 for this frame using information derived in the previous frame is similar. The transmit out (xmt out) clock of Buffer Clock section 105 of Controller 13 drives the preamble register at rate $R_t$ via line "g" and the PORT transmitter 17 outputs 6 bits of preamble in time interval $\tau_{1PV/H}$.

The Portable Set timing is controlled by a controllable clock synchronized to the PORT transmissions by a bit synchronizer 221 in the receiver 55. This bit clock at a rate $R_t$ on line "k" is converted in frequency multipliers and dividers of Bit rate Converter 251 in Controller 43 to rate $R_C = R_t \times (8/17)$ to clock the coder 45 and decoder 59 via lines "a" and "s". The bit clock on line "k" also drives a counter and logic 252 and the Buffer Clock section 255 of Controller 43. Frame synchronism is derived in Frame Synchronization device 224 that detects the preamble transmitted from the PORT and generates a frame sync pulse on line "m" by counting the bit clock. This frame sync pulse on line "m" is passed through the Start-Run Mode control section 253 of controller 43 in the "RUN" mode and appears on line "w" to establish frame sync from the counter and controllers in controller 43. The counter and logic of Counter 252 provide control pulses on lines $Z_1-Z_6$ at bit intervals following the frame sync pulse of 6, 12, 272, 278, 284 and 540 bits. These pulses are used to control transmit/receive, antenna selection, sample and hold and buffer sequences in sections 254 and 255 as described below. Thus, in the "RUN" mode, the bit clock and frame sync in the Portable Set are synchronized with the incoming bits and frames transmitted from the PORT. The Portable Set timing will be delayed from the PORT timing by the radio path delay which will be only about 1 μsec for a 1000 foot radio path. This delay will be accommodated in the 4 bit guard space mentioned earlier and described in more detail later.

During buffer frame A, being described for the Portable Set, the digital coder 45 is connected to the input of transmit buffer 201 and the decoder 59 is connected to the output of receive buffer 243 by the T/R controller portion of section 254 via line "f" and by the frame controller 250 via line "n", respectively. This connection is initiated by the frame sync from Start-Run Mode Control section 253 on line "w". The buffer clocks from section 255 of Controller 43 are also connected to clock the transmit buffer 201 and the receive buffer 243 at rate $R_c$ via lines "d" and "p", respectively. In the "RUN" mode, both the coder 45 and the decoder 59 are continuously clocked at rate $R_c$ via lines "a" and "s".

At the start of frame A, several control pulses are produced by the control logic in Section 254 of Controller 43. The T/R control logic portion controls the antenna T/R selection siwtch 52 via line "i" to connect the receiver 55 to the A/B antenna selection switch 53. The A/B control logic of section 254 controls the A/B antenna selection switch 53 via line "j" to connect the receiver 55 to antenna 50. Note, antennas 50 and 51 are spaced apart to produce uncorrelated multipath signal fading and are oriented perpendicular to each other to uncorrelate the signal fading resulting from random orientation of the Portable Set. The frame control 250 of Controller 43 connects the bit detector 222 into buffer 242 via switch 240 by a control signal on line "n". The sample-and-hold, S/H, control logic portion of section 254 sets a S/H circuit 231 for signal level acquisition via a control signal on line "t".

The Portable Set then receives the 6-bit preamble transmitted from the PORT in time interval $\tau_{1PV/H}$. If the signal level received by the Portable Set is adequate as determined by Amplitude Detector 223 and Threshold Detector 225, the bit synchronization is updated in device 221, the preamble is decoded in Frame Synchronization device 224, a preamble received pulse is produced by Frame Synchronization device 224 on line "l", and the frame synchronization for line "m" is verified. At the end of the 6-bit period, $\tau_{1PV/H}$, the S/H device 231 is caused to hold the received signal level via line "t".

At the end of $\tau_{1PV/H}$, the PORT control configuration remains unchanged. The 6-bit preamble transmission is repeated by the PORT in time interval $\tau_{2PV/H}$.

At the end of $\tau_{1PV/H}$ at the Portable Set, the A/B control logic portion of Section 254 of controller 43 switches the A/B antenna selection switch 53 to antenna 51 via line "j". At the same time, the S/H control logic portion of Section 254 sets S/H circuit 230 for signal level acquisition via line "u".

The Portable Set then receives the 6-bit preamble transmitted from the PORT in time interval $\tau_{2PV/H}$. If the signal level received by the Portable Set is adequate as determined by Amplitude Detector 223 and Threshold Detector 225, the bit synchronization in device 221 is updated, the preamble is decoded in Frame Synchronization device 224, a preamble received pulse is produced on line "l", and frame synchronization for line "m" is verified. At the end of $\tau_{2PV/H}$, a pulse on line "u" to S/H device 230 causes the received signal level to be held. It must be understood that in order to remain in the RUN mode, either the signal received on antenna 50 or on antenna 51 must be adequate. Otherwise, the Portable Set Start-Run Mode control section 253 of controller 43 switches the Portable Set back to "STARTUP" mode to be described later.

At the end of $\tau_{2PV/H}$, the PORT configures to transmit digitized voice or data. The PORT transmitter and antenna configurations remain as in $\tau_{1PV/H}$ and $\tau_{2PV/H}$. However, the T/R Control portion of section 104 of controller 13 in FIG. 4 connects transmit buffer 60 to the modulator 66 via switch 64 by a control signal on line "f". The transmitter output clock portion of section 105 of controller 13 pulses at rate $R_t$ on line "c" to transmit the 256-bit contents of buffer 60 in time interval $\tau_{MV/H}$.

At the end of $\tau_{2PV/H}$, the Portable Set knows which antenna, 50 or 51, received the strongest signal and this information is present as an output from the level comparator 232 of signal comparison arrangement 57 on line "v". The comparator 232 output is processed in the A/B control logic of section 254 of controller 43 and the antenna switch 53 is switched via line "j" to the antenna, 50 or 51, that received the strongest signal during $\tau_{1PV/H}$ and $\tau_{2PV/H}$. Recall that, at the start of the frame, the bit detector 222 output was switched into buffer 242. During time interval $\tau_{MV/H}$ the receiver input buffer clock of section 255 of controller 43 puts pulses on line "r" at a rate $R_t$ to cause the digitized voice or data transmitted by the PORT to be received into Portable-Set receive buffer 242.

At the end of $\tau_{MV/H}$, the PORT stops transmitting. The T/R controller portion of section 104 of controller 13 turns off the PORT transmitter 17 and switches the antenna T/R switch 22 to receive via lines "h" and "i", respectively. The input of receive buffer 93 is connected to the receiver output via switch 91 and a control signal on line "u". During the 4-bit guard time (i.e., dead time) neither the PORT nor the Portable Set transmits. This guard time allows energy stored in system filters and in the multipath propagation medium to decay so interference will not be caused to reception in the opposite direction in the next time intervals.

At the end of the 4-bit dead time, i.e., 272 bits at rate $R_t$ after the start of frame A, two S/H circuits 81 and 82 are set for signal level acquisition by the PORT S/H control logic portion of section 104 of controller 13 via line "v". The PORT is thus configured to receive on both antennas.

At the end of the 4-bit dead time, the Portable Set reconfigures to transmit. The T/R controller in section 254 of controller 43 in the Portable Set turns on the transmitter 47 and connects the transmitter 47 to the antenna selection switch 52 via lines "h" and "i", respectively. The A/B controller portion of Section 254 connects the transmitter 47 to antenna 50 via switch 53 by a control signal on line "j". The T/R controller of section 254 connects the preamble register 202 output to the modulator 206 via switch 204 by a control signal on line "f". The transmitter output buffer clock in section 255 of controller 43 drives the preamble register 202 at rate $R_t$ via line "g" to transmit the 6-bit preamble on antenna 50 during time interval $\tau_{PA}$.

During $\tau_{PA}$ the PORT receives the 6-bit preamble transmitted from the Portable Set. If the signal level received in one or the other PORT receivers 25 or 26 (or both) is adequate as determined by Threshold Detectors 75, the associated bit synchronization is updated in Bit Synchronization Device 71, the preamble is detected in Detector 74, and a preamble received pulse is produced on line "m" and/or "n". Bit synchronization is recovered in each PORT receiver 25 and 26 to adjust for PORT-to-Portable-to-PORT transmission delays between the master clock 100 and the receivers. The guard time allows the exact instant of frame timing to be less critical. Therefore, frame timing is controlled by the master clock 100. At the end of $\tau_{PA}$, the PORT S/H controller portion of section 104 of controller 13 sets the two S/H circuits 81 and 82 to hold via line "v" and sets the other two S/H circuits 80 and 83 for signal acquisition via line "x".

At the end of $\tau_{PA}$, the portable antenna select switch 53 is set to antenna 51 by the A/B controller portion of section 254 of controller 43 via line "j". The transmit output buffer clock portion of section 255 of controller 43 continues to drive the preamble register 202 via line "g" to transmit the 6-bit preamble on antenna 51 during time interval $\tau_{PB}$.

During $\tau_{PB}$ the PORT receives the 6-bit preamble transmitted from the Portable Set. If the signal level received in one or the other PORT receivers (or both) is adequate as determined by Threshold Detector 75 in each receiver 25 and 26, the associated bit synchronization in Bit Synchronization device 71 is updated, the preamble is detected in Preamble Detector 74, and a preamble received pulse is produced on line "m" and-/or line "n". At the end of $\tau_{PB}$, the PORT S/H controller portion of section 104 of controller 13 sets the two S/H circuits 80 and 83 to hold via line "x".

At this point in time, the PORT comparator 84 knows on which antenna the strongest signal was received and this information is transmitted on line "w" to controller 13. This is the information used to determine on which antenna, 20 or 21, the PORT will transmit during time intervals $\tau_{1PV/H}$, $\tau_{2PV/H}$ and $\tau_{MV/H}$ in the next buffer frame, i.e., in the next frame B shown in FIG. 10. It is the information similarly derived during time intervals $\tau_{PA}$ and $\tau_{PB}$ in previous frame B that was used to determine the PORT antenna for transmission during intervals $\tau_{1PV/H}$, $\tau_{2PV/H}$ and $\tau_{MV/H}$ of this frame A discussed earlier.

At the end of $\tau_{PB}$, the Portable Set transmits on antenna 50 or 51, depending on which antenna, 50 or 51, the strongest signal was received from the PORT during earlier intervals, $\tau_{1PV/H}$ and $\tau_{2PV/H}$, in this frame A. The appropriate antenna selection is made by logic in the A/B controller portion of section 254 in controller 43 and the antenna selection switch 53 is set via line "j". The T/R controller portion of section 254 of controller 43 connects portable-set transmit buffer 200 to the modulator 206 via switch 204 and a control signal on line "f". The 256 bits stored in buffer 200 are transmitted during interval $\tau_{MA/B}$. During $\tau_{MA/B}$, buffer 200 is clocked at rate $R_t$ by the transmit-out portion of the buffer clock section 255 in Controller 43 via line "c".

During $\tau_{MA/B}$, the PORT receives on the antenna, 20 or 21, which was used to transmit to the Portable Set in intervals $\tau_{1PV/H}$, $\tau_{2PV/H}$ and $\tau_{MV/H}$ earlier in this frame A and which was determined to be the best antenna (received the strongest signal) during $\tau_{PA}$ and $\tau_{PB}$ of the previous frame B. The appropriate PORT receiver, 25 or 26, output, V or H, to be connected to, for example, the receiver buffer 93 is selected by the V/H controller in section 104 of controller 13 via line "t" and switch 90 in Buffers 28, and the appropriate bit clock is selected via line "y₅" from control section 104 to operate switch 106 in controller 13. During $\tau_{MA/B}$ the 256 bits received by the PORT from the Portable Set are clocked into buffer 93 by the PORT receiver 25 or 26 input clock via line "r".

At the end of $\tau$MA/B the Portable Set T/R controller in section 254 of controller 43 turns off the transmitter 47 and switches the antenna to the receiver with switch 52 via lines "h" and "i", respectively. The time interval $\tau_{MA/B}$ is followed by another guard time indicated on the timing diagram with an interval length of 4 bits at rate $R_t$.

At the PORT the next frame, frame B, shown in FIG. 10, starts with a frame sync pulse from section 102 in controller 13 on line "Z₆" that occurs at the end of the 4-bit guard time that follows $\tau_{MA/B}$. At the start of frame B, frame sequencing pulses on line "Z₇" from section 102 of controller 13 cause switching of the transmit and receiver Buffers 16 and 28. The digital coder 15 output is switched via switch 63 into the transmit buffer 60 by the T/R controller in section 104 of controller 13 via line "f". The output of receive buffer 93 is switched via switch 92 to the decoder 29 input by the T/R controller in section 104 of controller 13 via line "u". The transmit buffer input clock and the receive buffer output clock are connected to clock transmit buffer 60 and received buffer 93 at rate $R_c$ via lines "b" and "q", respectively, from controller 13. The coder 15 and decoder 29 continue to be clocked at rate $R_c$. Transmissions and receptions at the PORT during frame B are illustrated in the timing diagram of FIG. 10. These transmission and receptions follow the same sequences as described earlier for frame A of FIG. 9 with the following modifications: (1) during time interval $\tau_{MV/H}$, the PORT transmits from buffer 61 and (2) during time interval $\tau_{MA/B}$, the PORT receives into buffer 94.

At the Portable Set, frame B starts with a frame sync pulse passed from the output of Frame Synchronization device 224 on line "m" to line "w" through the Start-Run Mode controller 253 of controller 43. At the start of frame B, the input to transmit buffer 200 is connected to the digital coder 45 via switch 203 by the T/R controller portion of section 254 of controller 43 via line "f" and the receive buffer 242 is connected to the decoder 59 via switch 241 by the frame controller 250 via line "n". The transmit buffer input clock and the receive buffer output clock from section 255 of controller 43 are connected to clock the transmit buffer 200 and the receive buffer 242 at rate $R_c$ via lines "b" and "q", respectively. The coder 45 and decoder 59 continue to be clocked at rate $R_c$. Transmission and reception sequences during frame B are illustrated in the timing diagram of FIG. 10. These sequences follow the same sequence described earlier for frame A of FIG. 9 with the following modifications: (1) during time interval $\tau_{MV/H}$, the Portable Set receives into buffer 243 and (2) during time interval $\tau_{MA/B}$, the Portable Set transmits from buffer 201.

The requirement for this system to provide good selection diversity performance is as follows; the elapsed time between the acquisition of knowledge of the best antenna in time intervals $\tau_{PA}$ and $\tau_{PB}$ and the last time that the knowledge is used in time interval $\tau_{MA/B}$ in the next frame must be small compared to the period of the multipath or orientation fading of the signals. For the system described, this elapsed time is about 12 milliseconds. For a 900 MHz radio system, the multipath fading period is about 100 milliseconds for motion of 5 ft./second. Thus, for this motion rate which is typical of walking, the 12 milliseconds is about 12 percent of the fading period which will provide good selection diversity performance. For faster motion rates, the buffer frame sequence can be appropriately shortened.

In the absence of received preambles, the Start-Run Mode controllers 103 and 253 in the PORT and the Portable, respectively, revert to the respective STARTUP modes. In both STARTUP modes the decoder 29 and 59 clock pulses on line "s" are inhibited to silence the respective receiver outputs.

In the STARTUP mode, the PORT cycles through the transmit-receive sequence for a frame as described for the RUN mode. However, in the absence of knowledge of a "best antenna" the PORT Start-Run Mode controller 103 causes the V/H antenna controller in section 104 of controller 13 via line "y4" to alternate the antenna selection switch 23 via line "j" between the antennas 20 and 21 in alternate buffer frames. Reception of a valid preamble by the preamble detector 74 in receivers 25 or 26 causes the Start-Run Mode controller 103 via lines "m" or "n" to change to the RUN mode described earlier.

In the STARTUP mode, the Portable Set Start-Run Mode controller 253 in controller 43 produces frame sync pulses on line "w" after every 12th bit at rate $R_t$. Information for these extra sync pulses comes from the counter 252 via line "Z$_2$". These STARTUP Mode sync pulses cause the Portable Set to receive on antenna 50 for a 6-bit time interval $\tau_{1PV/H}$, then to receive on antenna 51 for a 6-bit time interval $\tau_{2PV/H}$, then to recycle to receive on antenna 50 for another $\tau_{1PV/H}$, etc. When the signal is received from a PORT, the Portland Set bit clock from bit synchronization device 221 via line "k", will synchronize with the PORT transmissions, the frame synchronizer 224 will detect the PORT preamble and synchronize the Portable Set frame to the PORT frame, and the Portable Set START-Run Mode controller 253 in controller 43 will switch to the RUN mode.

It is to be understood that the above-described embodiments are simply illustrative of the principles of the present invention. Various other modifications and changes may be made by those skilled in the art which will embody the principles of the invention and fall within the spirit and scope thereof. For example, other arrangements for Buffers 16, 28, 46 and 58 and receivers 25, 26 and 55 can be substituted which will function to provide the overall technique taught by the present invention. Additionally, antennas 50 and 51 can comprise a combination of loops and dipoles integrally mounted on a single antenna as shown in FIG. 2 of the article "Polarization Diversity System for Mobile Radio" by W. C-Y. Lee et al in *IEEE Transactions on Communication*, Vol. COM-20, No. 5, October 1972 at page 913.

What is claimed is:

1. A portable transceiver comprising:
    a controller capable or providing control signals during predetermined time periods of a time division sequence;
    a transmitter capable of transmitting a digital preamble signal during a first and a second time slot of the time division sequence and a digital message signal during a third time slot of said time division sequence in response to control signals from the controller;
    a receiver capable of receiving from a remote location a digital preamble signal during a fourth and a fifth time slot of said time division sequence and a digital message signal during a sixth time slot of said time division sequence and determining from said received preamble signals during the fourth and fifth time slots which includes the stronger signal;
    a first and second spaced-apart antenna oriented substantially orthogonal to each other; and
    means responsive to control signals from the controller for switching the transmitter to the first and second antenna during said first and second time slots, respectively, and to the antenna determined by the receiver to have received the stronger preamble signal during the fourth and fifth time slot of an immediately prior time division sequence during the third time slot and for switching the receiver to the first and second antenna during the fourth and fifth time slot, respectively, and to the antenna providing the stronger signal in the fourth and fifth time slot during the sixth time slot of said time division sequence.

2. A transceiver according to claim 1 wherein the receiver comprises:
    amplitude detection means responsive to the received digital preamble signals from the remote location for generating a first and a second output signal indicative of the strength of said received preamble signals in the fourth and fifth time slots, respectively, of the time division sequence; and
    signal comparison means responsive to the first and second output signals from the amplitude detection means for generating an output signal indicative of which of said two output signals from the amplitude detection means was the stronger signal.

3. A transceiver according to claim 2 wherein the signal comparison means comprises a first and a second storage means capable of temporarily storing the first and second output signal, respectively, from the amplitude detection means, and a comparator for comparing the signals stored in the first and second storage means and generating said signal comparison means output signal.

4. A transceiver according to claim 1 wherein the receiver comprises:
   synchronization means responsive to the reception of the digital preamble and message signals from the remote location for providing bit clock control pulses therefrom to the collector which are synchronized to the bit transmissions of the received signals; and
   frame synchronization means responsive to the bit clock control pulses from the synchronization means for detecting the presence of the reception of a preamble signal from the remote location and generating a first output signal indicative of such reception to the controller and for generating a frame synchronization pulse to the controller indicative of the start of a frame of the time division sequence.

5. A transceiver according to claim 4 wherein the receiver further comprises:
   amplitude detecting means responsive to the received digital preamble and message signals from the remote location for generating output signals indicative of the strength of said received signals during the fourth to sixth time slots of the time division sequence; and
   threshold detection means responsive to the output signals from the amplitude detecting means for generating a first control signal to the bit synchronization means when any one of the output signals from the amplitude detecting means is below a predetermined threshold level and a second control signal to the bit synchronization means when any one of the output signals from the amplitude detecting means is equal to or above said predetermined threshold level.

6. A transceiver according to claim 5 wherein the synchronization means is responsive to a predetermined number of sequential first control signals from the threshold detection means for providing control signals via said frame synchronization means to the controller indicative of a fade condition for providing free running bit clock control pulses until termination of the fade condition.

7. A transceiver according to claim 6 wherein the controller comprises start-run mode control means responsive to control signals from the frame synchronization means indicating a loss of synchronization for causing the cessation of message signal transmission during the third time slot of the time division sequence until the signal level of the received preamble signals from the remote location on one of the antennas is found to be above said predetermined threshold level by the threshold detecting means.

8. A portable communication system comprising:
   a terminal station comprising
   a controller capable of providing control signals during predetermined time periods of a time division sequence;
   a transmitter capable of transmitting (1) a digital preamble signal during a first and a second time slot of a frame period of the time division sequence and (2) a digital message signal during a third time slot of said frame period in response to control signals from the controller;
   a first and a second antenna capable of transmitting or receiving a first and a second orthogonally polarized signal, respectively;
   a receiving section comprising a first and a second receiver capable of being coupled to the first and second antenna, respectively, and receiving from a remote portable transceiver a same first and second orthogonally transmitted digital preamble signal during a fourth and fifth time slot, respectively, of a frame period of the time division sequence; and means for determining from the received preamble signals which antenna received the strongest signal and for transmitting control signals corresponding to such determination to the controller; and
   means responsive to control signals from the controller for switching the transmitter, during the first to third time slots, to the first or second antenna determined by the receiver section determining means to have received the strongest signal during the fourth and fifth time slots of an immediately prior frame, and for connecting the first and second receivers to the first and second antennas, respectively, during the fourth and fifth time slots of a frame period and maintaining the antennas-to-receivers connections during a sixth time slot of the frame period for reception of a message signal from the remote transceiver by the receiver having been determined by the determining means of the receiver section to have received the strongest signal during the fourth and fifth time slots of the immediately previous frame period.

9. A portable radio communication system according to claim 8 wherein the system further comprises:
   a portable transceiver comprising:
   a controller capable of providing control signals during predetermined time periods of the time division sequence;
   a transmitter capable of transmitting a digital preamble signal during a first and a second time slot of the time division sequence and a digital message signal during a third time slot of said time division sequence in response to control signals from the controller;
   a receiver capable of receiving from the terminal station a digital preamble signal during each of the fourth and fifth time slots of said time division sequence and a digital message signal during the sixth time slot of said time division sequence and determining from said received preamble signals which signal included the stronger signal;
   a first and a second spaced-apart antenna oriented substantially orthogonal to each other; and
   means responsive to control signals from the controller for switching the transmitter to the first and second antenna during said first and second time slots, respectively, and to the antenna determined by the receiver to have received the stronger preamble signal during the fourth and fifth time slot of an immediately prior frame of the time division sequence and for switching the receiver to the first and second antenna during the fourth and fifth time slot, respectively, and to the antenna providing the stronger signal in said fourth and fifth time slots during the sixth time slot of said time division sequence.

10. A portable radio communication system according to claim 9 wherein the receiver of the transceiver comprises:

amplitude detection means responsive to the received digital preamble signals from the terminal station for generating a first and a second output signal indicative of the strength of said received preamble signals in the fourth and fifth time slots, respectively, of the time division sequence; and signal comparison means responsive to the first and second output signals of the amplitude detection means for generating an output signal indicating which of said two output signals from the amplitude detection means was the stronger signal.

11. A portable radio communication system according to claim 10 wherein the signal comparison means comprises a first and a second storage means capable of temporarily storing the first and second output signal, respectively, from the amplitude detection means, and a comparator for comparing the signals stored in the first and second storage means and generating said signal comparison means output signal.

12. A portable radio communication system according to claim 9 wherein the receiver of the transceiver comprises:

synchronization means responsive to the reception of the digital preamble and message signals from the terminal station for providing bit clock control pulses therefrom to the controller which are synchronized to the bit transmissions of the received signals; and frame synchronization means responsive to the bit clock control pulses from the synchronization means for detecting the presence of the reception of a preamble signal from the terminal station and generating a first output signal indicative of such reception to the controller and for generating a frame synchronization pulse to the controller indicative of the start of a frame of the time division sequence.

13. A portable radio communication system according to claim 12 wherein the receiver of the transceiver further comprises:

amplitude detecting means responsive to the received digital preamble and message signals from the terminal station for generating output signals indicative of the strength of said received signals during the fourth to sixth time slots of the time division sequence; and threshold detection means responsive to the output signals from the amplitude detecting means for generating a first control signal to the bit synchronization means when any one of the output signals from the amplitude detecting means is below a predetermined threshold level and a second control signal to the bit synchronization means when any one of the output signals from the amplitude detecting means is equal to or above said predetermined threshold level.

14. A portable radio communication system according to claim 13 wherein the synchronization means is responsive to a predetermined number of sequential first control signals from the threshold detection synchronization means to the controller indicative of a fade condition occurring for providing free running bit clock control pulses until termination of the fade condition.

15. A method of adaptive retransmission comprising the steps of:

in a portable transceiver (a) receiving from a remote terminal station a first sequence of binary information, which was transmitted by the terminal station in a first or second orthogonally polarized signal, via a first antenna section of the portable transceiver and determining therefrom the signal strength of the received signal during a first time slot of a frame of a time division sequence;

(b) receiving from the terminal station a second sequence of binary information, which was transmitted by the terminal station in a second signal polarized the same as said first polarized signal, via a second antenna section of the portable transceiver which is oriented substantially orthogonal and in the same plane as said first antenna section and determining therefrom the signal strength of the received second signal during a second time slot of the frame of the time division sequence;

(c) transmitting from the portable transceiver via the first antenna section a third sequence of binary information to the remote terminal station in a third time slot of a frame of the time division sequence;

(d) transmitting from the portable transceiver via the second antenna section a forth sequence of binary information to the remote terminal station in a fourth time slot of a frame of the time division sequence;

(e) determining from steps (a) and (b) which of the first and second antenna section of the transceiver provided a received signal from the terminal station with a greater signal strength;

(f) reiterating steps (a) to (e) in each subsequent time division sequence;

(g) concurrent with step (f), transmitting from the transceiver during a fifth time slot of the time division sequence immediately after step (d), a fifth sequence of binary information comprising message bits via the antenna section determined in step (e) to have provided the greater signal strength; and (h) concurrent with step (f), receiving from the terminal station during a sixth time slot immediately following the second time slot of a frame, a sixth sequence of binary information comprising message bits via the antenna section determined in step (e) to have provided the greater signal strength.

16. A method of adaptive retransmission according to claim 15 wherein in steps (a) and (b) the first and second sequence of binary information comprise the same binary preamble information.

17. A method of adaptive retransmission according to claim 15 wherein the method comprises the further steps of:

in the terminal station (i) concurrent with step (a), transmitting said first sequence of binary information in said first polarized signal via a first antenna section of the terminal station;

(j) concurrent with step (b), transmitting said second sequence of binary information in said second signal via the same antenna section of the terminal station used in step (i);

(k) concurrent with step (c), receiving said third sequence of binary information in a first and a second receiver of the terminal station via said first antenna section and a second antenna section, respectively, where said first and second antenna sections are capable of transmitting or receiving respective first and second orthogonally polarized signals;

(l) concurrent with step (d), receiving said fourth sequence of binary information in said first and second receivers via said first and second antenna sections, respectively, of the terminal station;

(m) determining from steps (k) and (l) which receiver received the signal with the greatest strength; and (n) concurrent with step (h), transmitting said sixth sequence of binary information via the first or second antenna section of the terminal station determined as providing the strongest signal in step (m).

* * * * *